United States Patent
Tomasiak et al.

(10) Patent No.: US 9,456,722 B2
(45) Date of Patent: Oct. 4, 2016

(54) BACKPACK VACUUM CLEANER

(71) Applicants: Mark Tomasiak, St. Louis, MO (US); Douglas K. Ritterling, St. Louis, MO (US); Shane Glasgow, St. Louis, MO (US)

(72) Inventors: Mark Tomasiak, St. Louis, MO (US); Douglas K. Ritterling, St. Louis, MO (US); Shane Glasgow, St. Louis, MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 14/458,798

(22) Filed: Aug. 13, 2014

(65) Prior Publication Data

US 2015/0047146 A1 Feb. 19, 2015

Related U.S. Application Data

(60) Provisional application No. 61/865,605, filed on Aug. 13, 2013.

(51) Int. Cl.
| | |
|---|---|
| A47L 5/14 | (2006.01) |
| A47L 5/36 | (2006.01) |
| A47L 9/28 | (2006.01) |
| E01H 1/08 | (2006.01) |
| A01G 1/12 | (2006.01) |

(52) U.S. Cl.
CPC .............. *A47L 5/365* (2013.01); *A47L 9/2884* (2013.01); *A01G 1/125* (2013.01); *E01H 1/0809* (2013.01)

(58) Field of Classification Search
CPC ..... A47L 5/365; A47L 9/2884; A01G 1/125; E01H 1/0809
USPC ................... 15/327.5, 344, 405; D32/16, 18
IPC ......................................................... A47L 5/14
See application file for complete search history.

(56) References Cited

U.S. PATENT DOCUMENTS

| | | | |
|---|---|---|---|
| 5,588,177 A | 12/1996 | Eriksen | |
| 6,154,921 A | 12/2000 | Green et al. | |
| 7,509,706 B2 | 3/2009 | Clarke | |
| 8,464,392 B2 | 6/2013 | Sato et al. | |
| D686,789 S | 7/2013 | Bisson | |
| 2002/0166194 A1* | 11/2002 | Dahlberg | A01G 1/125 15/326 |
| 2007/0044270 A1* | 3/2007 | Crevling | A47L 5/14 15/327.5 |
| 2007/0174992 A1 | 8/2007 | Murray et al. | |
| 2011/0146023 A1* | 6/2011 | Wada | A01G 1/125 15/327.5 |
| 2014/0007370 A1* | 1/2014 | Thackery | A01G 1/125 15/327.5 |
| 2014/0096339 A1* | 4/2014 | Niederman | A47L 5/36 15/327.5 |

* cited by examiner

*Primary Examiner* — David Redding
(74) *Attorney, Agent, or Firm* — Sutton McAughan Deaver PLLC

(57) ABSTRACT

A vacuum cleaner is described that includes an elongated vacuum body, an optional battery-pack attached to the bottom end of the elongated vacuum body, and a removable backpack assembly with shoulder and waist straps attachable directly to the elongated vacuum body. The shape of the elongated vacuum body is such that the center of gravity of the body is shifted close to the body of the vacuum appliance user, allowing for greater freedom of movement during use. The vacuum appliance also includes exhaust air vents positioned to reduce the noise output of the vacuum appliance as perceived by the user during use.

19 Claims, 6 Drawing Sheets

BACKPACK VACUUM CLEANER

CROSS REFERENCE TO RELATED APPLICATIONS

The present application claims priority to U.S. Provisional Patent Application Ser. No. 61/865,605, filed Aug. 13, 2013, the contents which are incorporated herein by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to vacuum appliances, and more specifically are related to backpack vacuum cleaners and portable vacuum cleaners.

2. Description of the Related Art

Various configurations of vacuum cleaners are well known. Examples of specific applications for which vacuum cleaners are configured include, but are not limited to, general home cleaning, cleaning industrial/work sites and cleaning automobile interiors. The general premise of operation of a vacuum cleaner is that a vacuum created by the vacuum cleaner serves to lift debris, water, and the like into a collection container of the vacuum cleaner typically through a flexible hose.

Portability and versatility are two valuable and useful attributes of a vacuum cleaner. Portability enables a vacuum cleaner to be used at different physical locations (e.g., different rooms in a building, different buildings, etc). Versatility enables a vacuum to be operated in a manner that is entirely or somewhat specific to a given application. For example, a vacuum cleaner that includes different cleaning attachments can be used in any number of different cleaning applications (e.g., cleaning water from floors, cleaning dust and debris off floors, cleaning dust and debris from wall and ceiling mounted fixtures, etc). Together, portability and versatility add value to a vacuum cleaner in that it can be used for a wide array of applications at any number of different locations.

Therefore, a vacuum cleaner that provides for portability and versatility is desirable in many applications. For example, at a construction/work site, a considerable amount of debris is typically generated. Examples of such debris include pieces of paper and plastic, various forms of dust, wasted supplies and the like. Accordingly, it is desirable that a vacuum used in a construction/work site be configured for efficiently picking up such debris (i.e., a high suction capability and easy is emptying of debris) and for being conveniently carried such that it is not on the floor being pulled through such debris. Such a vacuum ideally sits appropriately on the user so as to not cause physical pain after extended use, and has a reduced noise output as perceived by the user. Furthermore, because electrical outlets at construction/work sites are often sparse or entirely not available, a vacuum with an on-board power supply (e.g., a rechargeable battery-pack) is sometimes desirable as it enhances portability.

The inventions disclosed and taught herein are directed to improved backpack vacuum cleaners.

BRIEF SUMMARY OF THE INVENTION

The objects described above and other advantages and features of the invention are incorporated in the application as set forth herein, and the associated appendices and drawings, related to vacuum appliances wearable on the back of the user, and optionally being battery powered.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
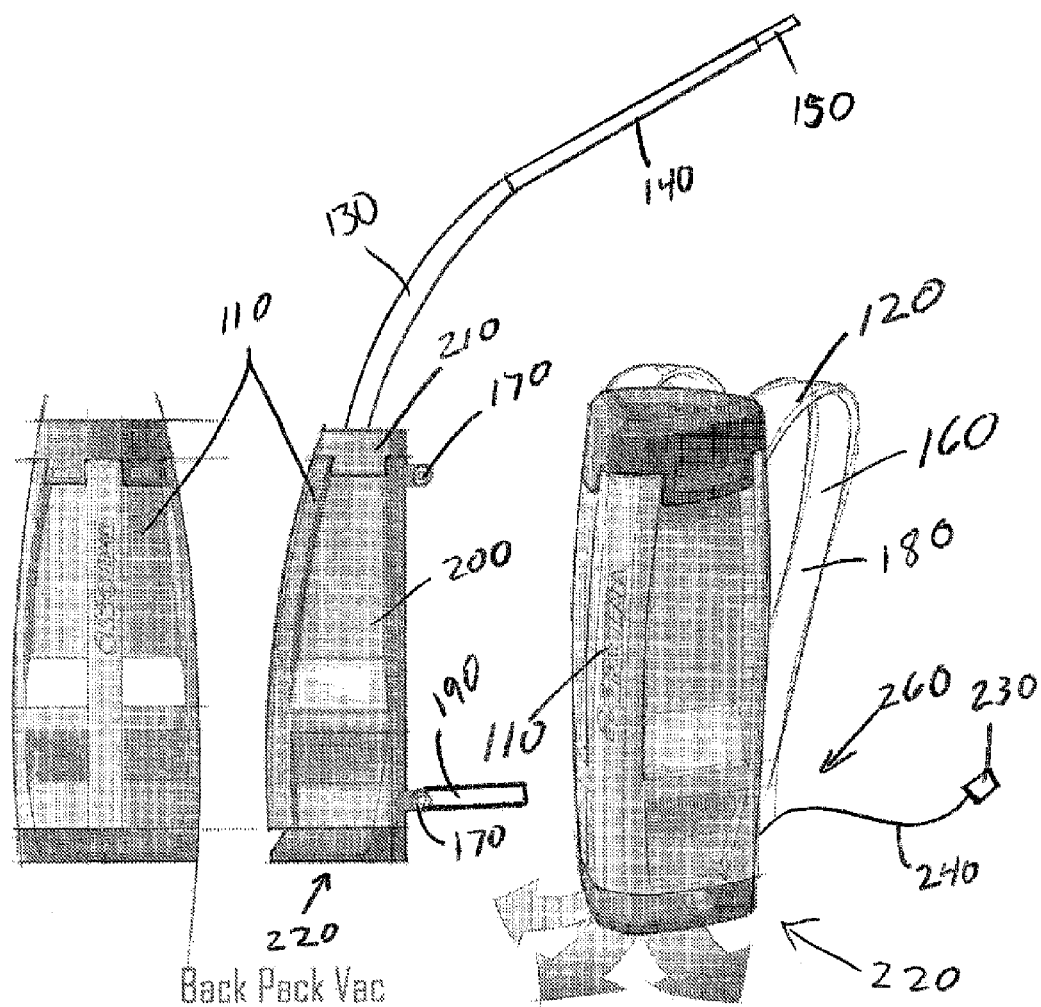
FIG. 1 illustrates several views of an exemplary vacuum appliance in accordance with aspects of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written is description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created improved vacuum appliances that are wearable on the back of a user for extended periods of time.

Turning now to the figures, FIG. 1 is a general illustration of the backpack vacuum cleaner 100 includes a vacuum cleaner assembly 110 that is carried on a user's back via a backpack assembly 120. A vacuum cleaner hose 130 extends from a top of the vacuum cleaner assembly 110 and is connected to a vacuum cleaner wand 140. A distal end of the vacuum cleaner wand 140 includes a vacuum cleaner floor tool 150, which engages the carpet or other floor surface for cleaning the same.

With reference additionally to FIG. 1, the backpack assembly 120 includes a backpack strap system 160 connected to a vacuum cleaner support 170, which carries the vacuum cleaner assembly 110. The backpack strap system 160 includes shoulder straps 180 and a waist belt 190.

The vacuum cleaner assembly 110 includes a main housing assembly 200, a top cap hose and air inlet 210 at a top end, and an opposite exhaust end 220. A two-speed switch assembly with switch box 230 and a power cord assembly 240 are connected to a lower electrical section 260 (FIG. 1) of the vacuum cleaner assembly 110 through respective cords.

Current back pack vacuum appliances having a generally cylindrical shape have been in production for many years. One of the obstacles to people using such vacuum appliances is the perceived weight and bulkiness of the product. The new innovative shape of the vacuum appliance shown in FIGS. 1-2 make the design slimmer by making it thinner, and wider along the body to reduce the bulkiness. These 2 new concepts allow for moving the center of mass closer to the body, thereby reducing the cantilevered load causing increased weight to be felt on shoulders, normally associated with a round back pack.

Figure 2:
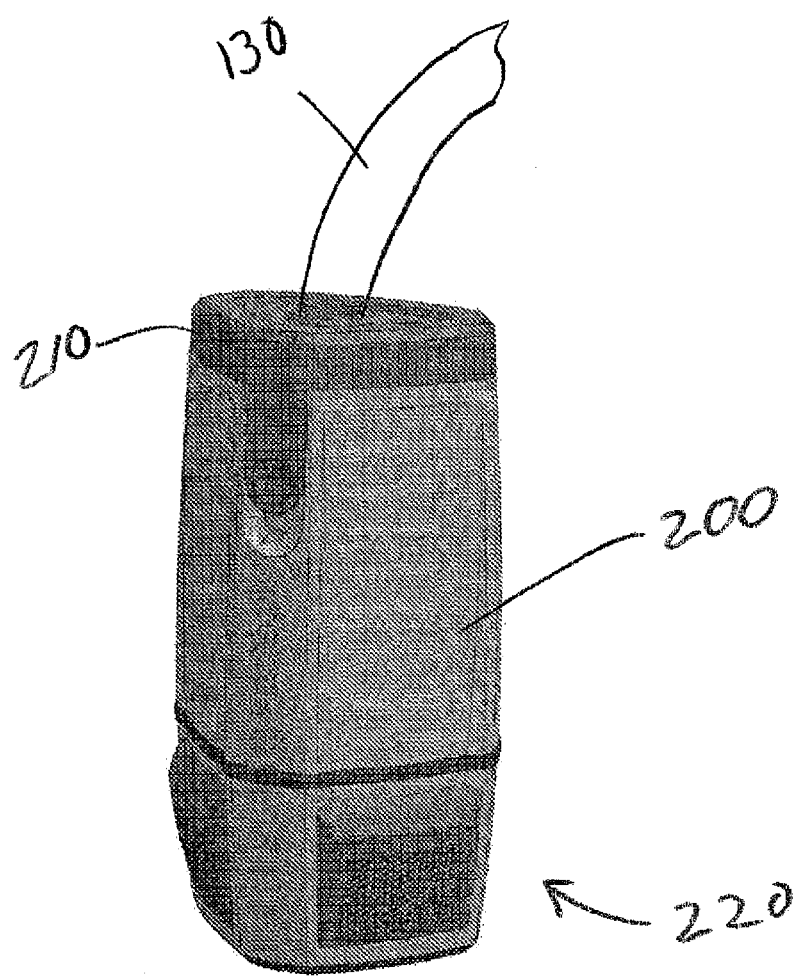
FIG. 2 illustrates a front perspective view of a vacuum appliance in accordance with aspects of the present disclosure.
Figure 3:
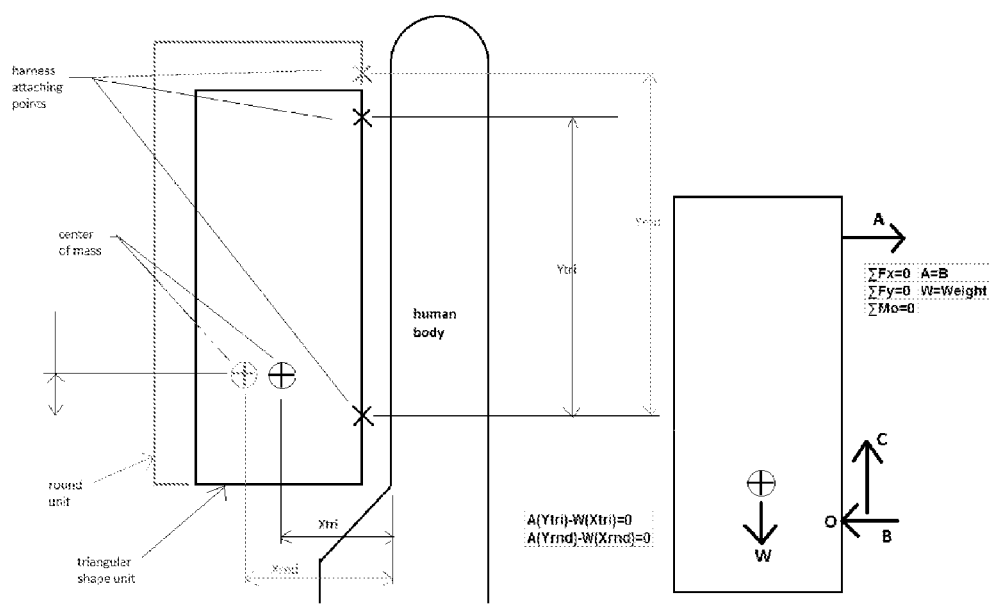
FIG. 3 illustrates a schematic, comparative diagram of select forces associated with a user wearing different backpack vacuum appliances.

The thinner triangulated shape of the vacuum appliance design shown in FIGS. 1-2 allows for moving the motor of the product closer to the back of the user. Since this is a large portion of the weight of the product, this shifts the center of mass closer to the users body, reducing the cantilever load. In addition to moving the motor, this wider shape allows for more of the capacity of the unit to be shifted to the sides, further moving the center of mass closer to the body. Increasing the width of the product, while keeping it closer to the users body, allows for the capacity of the product to be increased per unit of height. This allows for a shorter product, further is emphasizing the less bulky appearance of product.

Figure 4:
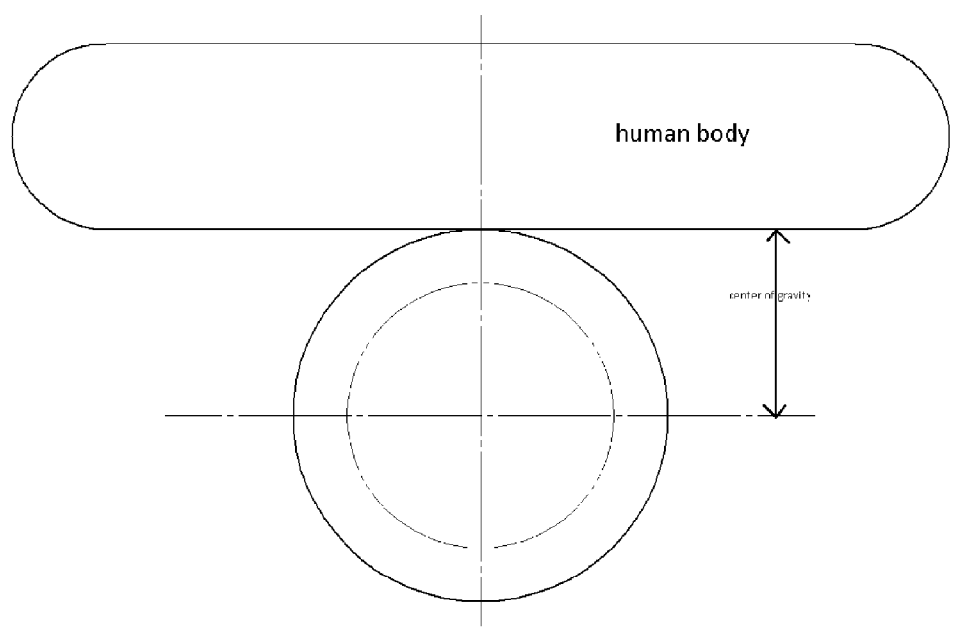
FIG. 4 illustrates a schematic representation of the center of gravity associated with a cylindrical-shaped vacuum appliance.

The traditional back pack vacuum appliance design utilizes a round shape and concentric motor positioning. As illustrated in FIG. 4, the center of mass of a cylindrical vacuum appliance is same as center of outer shell. The motor could be moved closer to the user's body, but this is only about ⅓ of the product weight, so the center of mass would only move marginally towards a user's back.

Figure 5:
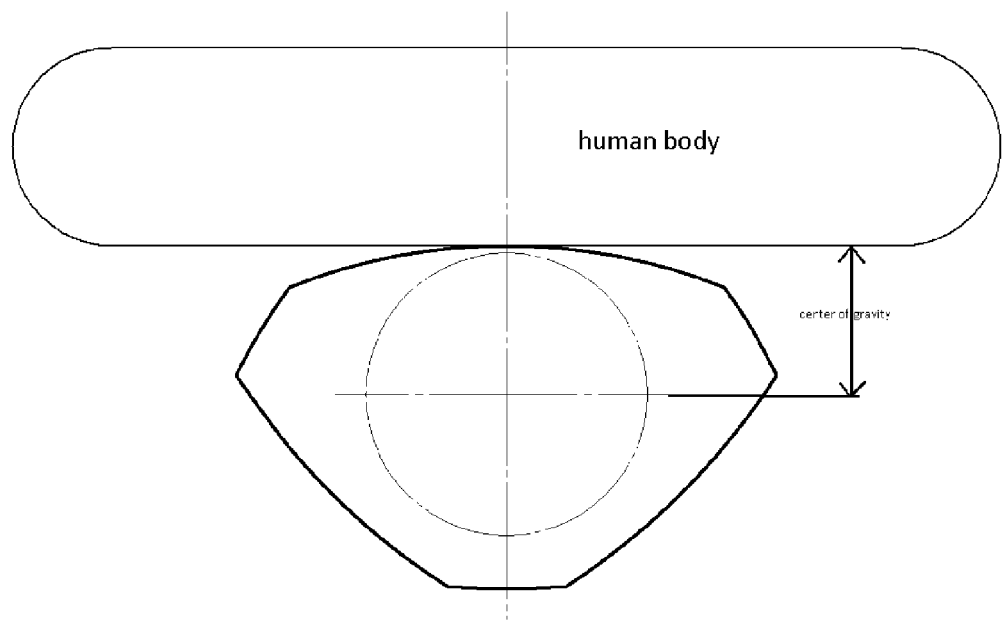
FIG. 5 illustrates a schematic representation of the center of gravity associated with a vacuum appliance in accordance with aspects of the present disclosure.
Figure 6:
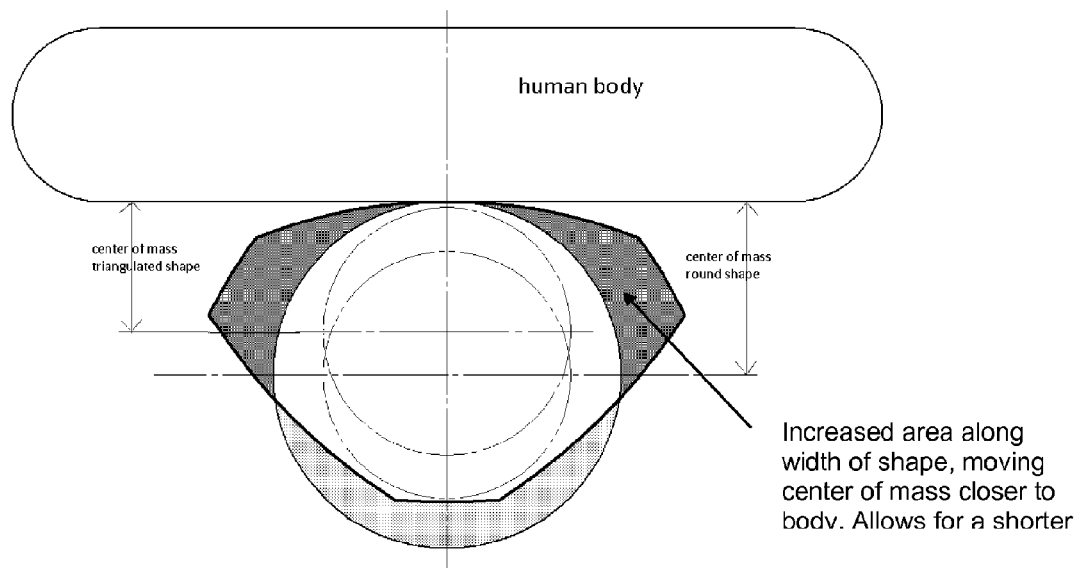
FIG. 6 illustrates a schematic, comparative representation of the center of gravity and associated effects of the two differently-shaped vacuum appliances.

As illustrated generally in FIGS. 5-6, the innovative triangulated shape of the body of the vacuum appliance narrows the overall design, moving the center of mass of the outer shell closer to the user's body. In addition, the motor is positioned as close as possible to the users' body. This also shifts the center of mass closer to the body.

In addition to thinning the design, and moving of the motor as close as possible to the body, a further advantage is moving more of the capacity of the product closer to the users' body. Back pack vacuum appliances are typically sold in standard capacities, typically 6 and 10 quart. Utilizing more capacity of a shape closer to the user's body allows for moving the center of mass still closer to the body. In addition, using more width for storage capacity allows for the unit to be made shorter, which reduces the lever arm portion of cantilevered load as the product is attached to the body. The only way for a traditional unit to add capacity when making the body shorter would be to increase its diameter. This would have a negative effect as it moves the center of mass further away from the body. In addition to the advantages described herein, the unit is more mobile in tight spaces as its shape is closer to the users' body. There is less chance of the unit bouncing into doorways, bookcases, etc.

While the body shape of the vacuum appliance is generally illustrated to be triangular, there are many shapes that could be used to make the unit thinner and obtain a similar center of gravity (Cg) effect. These would include oval, rectangular, is elliptical, etc. These shapes are thinner, but do not possess all of the advantages of a triangulated shape. The narrower triangular shape allows for more area closer to users back, while giving enough rounded shape to withstand the vacuum pressure created by the motor. The triangulated shape shown has some chamfered corners, which could either be enhanced or decreased.

As has been described above, the triangulated shape has many benefits to the rounded shape. These include the effective use of area close to the units back, motor positioned as close as possible to users back, and inherent shorter product. These all contribute to a design that is perceived as less bulky, while reducing the cantilevered load on users back, making the unit feel lighter.

Other and further embodiments utilizing one or more aspects of the inventions described above can be devised without departing from the spirit of Applicant's invention. For example, while the vacuum body has been shown and described to be generally triangular in cross-section, it may be other non-circular geometric shapes as appropriate, providing that the center of gravity feature described herein remains present. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A vacuum cleaner assembly for a backpack vacuum cleaner including a backpack assembly for carrying the vacuum cleaner assembly on a user's back, a vacuum cleaner hose for vacuuming debris from a surface, a filter for filtering out vacuumed debris, and a vacuum motor for drawing air through the vacuum cleaner hose and filter, the vacuum cleaner assembly comprising:
   a non-cylindrical vacuum body that is triangular in horizontal cross-section;
   an air inlet for communicating with the vacuum cleaner hose and the filter, the inlet at an upper end of the vacuum body;
   an exhaust assembly in communication with the vacuum motor for expelling exhaust from the vacuum motor, and
   wherein the exhaust assembly is located at the lower end of the vacuum body.

2. The vacuum cleaner assembly of claim 1, wherein a center of mass of the body is closer to the user's back than a cylindrical body.

3. The vacuum cleaner assembly of claim 1, wherein the body includes three curved sidewalls.

4. The vacuum cleaner assembly of claim 3, wherein the curved sidewalls are curved along both a horizontal axis and a vertical axis.

5. The vacuum cleaner assembly of claim 1, wherein the body includes three chamfered corners.

6. A vacuum cleaner assembly for a backpack vacuum cleaner including a backpack assembly for carrying the vacuum cleaner assembly on a user's back, a vacuum cleaner hose for vacuuming debris from a surface, a filter for filtering out vacuumed debris, and a vacuum motor for drawing air through the vacuum cleaner hose and filter, the vacuum cleaner assembly comprising:
   a vacuum body having a generally triangular horizontal cross section;
   an air inlet for communicating with the vacuum cleaner hose and the filter; and
   an exhaust assembly in communication with the vacuum motor for expelling exhaust from the vacuum motor.

7. The vacuum cleaner assembly of claim 6, wherein the inlet is located at an upper end of the vacuum body.

8. The vacuum cleaner assembly of claim 6, wherein the exhaust assembly is located at the lower end of the vacuum body.

9. The vacuum cleaner assembly of claim 6, wherein a center of mass of the body is closer to the user's back than a cylindrical body.

10. The vacuum cleaner assembly of claim 6, wherein the body includes three curved sidewalls.

11. The vacuum cleaner assembly of claim 10, wherein the curved sidewalls are curved along both a horizontal axis and a vertical axis.

12. The vacuum cleaner assembly of claim 6, wherein the body includes three chamfered corners.

13. A vacuum cleaner assembly for a backpack vacuum cleaner including a backpack assembly for carrying the vacuum cleaner assembly on a user's back, a vacuum cleaner hose for vacuuming debris from a surface, a filter for filtering out vacuumed debris, and a vacuum motor for drawing air through the vacuum cleaner hose and filter, the vacuum cleaner assembly comprising:
   a vacuum body having shape that is triangulated in horizontal cross section;
   an air inlet for communicating with the vacuum cleaner hose and the filter; and
   an exhaust assembly in communication with the vacuum motor for expelling exhaust from the vacuum motor.

14. The vacuum cleaner assembly of claim 13, wherein the inlet is located at an upper end of the vacuum body.

15. The vacuum cleaner assembly of claim 13, wherein the exhaust assembly is located at the lower end of the vacuum body.

16. The vacuum cleaner assembly of claim 13, wherein a center of mass of the body is closer to the user's back than a cylindrical body.

17. The vacuum cleaner assembly of claim 13, wherein the body includes three curved sidewalls.

18. The vacuum cleaner assembly of claim 17, wherein the curved sidewalls are curved along both a horizontal axis and a vertical axis.

19. The vacuum cleaner assembly of claim 13, wherein the body includes three chamfered corners.

* * * * *